United States Patent [19]

Raudalus et al.

[11] Patent Number: 5,556,658
[45] Date of Patent: Sep. 17, 1996

[54] METHOD FOR PACKAGING, STORING AND VENTILATING PRODUCE

[75] Inventors: Gustavo Raudalus, San Pedro Sula, Honduras; Raul Fernandez, San Jose, Costa Rica; Franklin Sanabria, San Jose, Costa Rica; Rodrigo Barsallo, San Jose, Costa Rica; Salomon Chong, San Pedro Sula, Honduras; Elmer Howell, San Jose, Costa Rica; Francisco Rodriguez, San Jose, Costa Rica; Randall Petersen, San Jose, Costa Rica; Daniel Mullock, Cincinnati, Ohio

[73] Assignee: Chiquita Brands, Inc., Cincinnati, Ohio

[21] Appl. No.: 342,085

[22] Filed: Nov. 18, 1994

Related U.S. Application Data

[63] Continuation-in-part of Ser. No. 160,890, Nov. 30, 1993, Pat. No. 5,433,335.

[51] Int. Cl.$^6$ .................................................. B65B 25/04
[52] U.S. Cl. ........................ 426/411; 426/124; 426/419
[58] Field of Search .................................. 426/124, 411, 426/419, 122, 123; 220/403, 410, 461, 462; 383/203, 204, 206, 208, 209; 229/120, 916

[56] References Cited

U.S. PATENT DOCUMENTS

| | | |
|---|---|---|
| 1,653,116 | 12/1927 | Parks . |
| 1,664,308 | 3/1928 | Miller . |
| 2,162,272 | 6/1939 | Patterson .................................. 426/77 |
| 2,194,008 | 3/1940 | Colburn .................................. 426/124 |
| 3,097,781 | 7/1963 | Masi . |
| 3,249,445 | 5/1966 | Hackett .................................. 426/124 |
| 3,393,858 | 7/1968 | Heel . |
| 3,450,542 | 6/1969 | Badran .................................. 426/419 |
| 3,738,568 | 6/1973 | Ruda . |
| 3,782,619 | 1/1974 | Dittbenner . |
| 4,056,223 | 11/1977 | Williams . |
| 4,081,124 | 3/1978 | Hall . |

(List continued on next page.)

FOREIGN PATENT DOCUMENTS

| | | |
|---|---|---|
| 0216763 | 9/1986 | European Pat. Off. . |
| 2001829 | 9/1971 | Germany .................................. 426/123 |
| 18866 | of 1899 | United Kingdom .................... 426/123 |
| 778310 | 7/1957 | United Kingdom . |
| 2043596 | 10/1980 | United Kingdom . |

OTHER PUBLICATIONS

*Prevention of Postharvest Food Losses: Fruits, Vegetables and Root Crops. A Training Manual.* 1989, United Nations Food and Agricultural Organization, pp. 125–128.

*Primary Examiner*—Steven Weinstein
*Attorney, Agent, or Firm*—Frost & Jacobs

[57] ABSTRACT

A container system for the shipping and storing of product such as bananas, comprising: (a) a substantially rigid outer container having at least one ventilation opening; (b) a closable inner container positioned within the outer container receiving the product, the inner container having a bottom portion and a top portion; and (c) means attached to the top portion of the inner container for opening the inner container so as to provide increased ventilation to the product. The inner container preferably comprises a flexible bag having a sealed bottom as its bottom portion, an open top adjacent the top portion, and a perforation extending about at least a portion of the bag, so that the opening means opens the bag by severing the bag at the perforation. The opening means may comprise a cord attached to the top portion of the bag. A method of packing, shipping and storing product utilizing this container is provided. A method of ventilating and storing a plurality of stacked boxes using this container system is provided. A method of producing a container of banana clusters is also provided, wherein the banana clusters are placed into a container in a four row pattern with the two upper-most rows in a crowns-up configuration. Various cushioning pads for this packing pattern are also provided.

15 Claims, 11 Drawing Sheets

U.S. PATENT DOCUMENTS

| | | | |
|---|---|---|---|
| 4,528,228 | 7/1985 | Clevenger | 426/419 |
| 4,572,422 | 2/1986 | Heuberger et al. | |
| 4,635,814 | 1/1987 | Jones | |
| 4,715,271 | 12/1987 | Kitagawa | 426/77 |
| 4,725,329 | 2/1988 | Tani | |
| 4,777,054 | 10/1988 | Greenhouse | |
| 4,800,089 | 1/1989 | Scott | 426/77 |
| 4,872,420 | 10/1989 | Shepard | |
| 5,116,140 | 5/1992 | Hirashirma | |
| 5,121,877 | 6/1992 | Bodary et al. | |
| 5,130,152 | 7/1992 | Alameda | |
| 5,350,110 | 9/1994 | Will | |
| 5,433,335 | 7/1995 | Raudalus | |

METHOD FOR PACKAGING, STORING AND VENTILATING PRODUCE

BACKGROUND OF INVENTION

This application is a continuation-in-part of Ser. No. 08/160,890, filed on Nov. 30, 1993, now U.S. Pat. No. 5,433,335.

FIELD OF THE INVENTION

This invention relates to an improved container system for products, particularly perishable products such as bananas, an improved method of producing a container of banana clusters, and a method of ventilating and storing product. More particularly, the present invention provides a container system and method which employ a closeable inner container which can be readily opened to provide increased ventilation to the product, an outer container of an optionally improved design, and a means for opening the inner container without a need to access the outer container. In addition, a new method for inserting banana clusters into a container is provided.

DESCRIPTION OF RELATED ART

Most products must be shipped from one point to another prior to their sale to consumers, and are usually stored for a period of time at one or both locations. During shipping and storing, however, ventilation, heating, and/or cooling must often be provided to the products for various reasons. Perishable products such as fruit, for example, may require ventilation and cooling in order to maintain their freshness. Without such ventilation or temperature control means, these products might arrive at their final destination in a spoiled or damaged condition. Thus, it is usually not sufficient to merely package these perishable products in closed containers.

Previous containerization methods for perishable products such as fruits and vegetables have often employed containers having various ventilation means. For example, most fruits are shipped to retailers from the location where they are grown in corrugated boxes having a plurality of ventilation openings. These corrugated boxes not only provide a means for ventilating and controlling the temperature of the fruit, but are also light-weight and relatively inexpensive to manufacture. One drawback of these corrugated containers, however, is that they generally cannot be reused. Thus, any reduction in the amount of materials used in their manufacture is of great value.

Many products such as fruits and vegetables also have ventilation and temperature parameters which must be varied during shipping and storing. Thus, at certain points during the shipping and/or storing periods it may be necessary to increase ventilation, or raise or lower the temperature of the products in order to ensure optimal freshness. One product for which this is particularly true is bananas. Bananas are typically packed in the form of banana clusters (or hands) into corrugated containers (i.e., boxes) at the plantation where they are harvested in a very green, unripened state. These cardboard boxes are then placed within large shipping containers, which are in turn placed in refrigerated ships. During shipment the pulp temperature of the bananas is kept at a temperature between 56° and 59° F. Once the ship has docked, the bananas are transferred to refrigerated trucks or rail cars, and transported to a warehouse or the like. Once again, the pulp temperature is maintained between 56° and 59° F. in order to retard the ripening of the bananas, thereby prolonging the shelf life of the bananas. In order to maintain this temperature range, it is necessary to provide ventilation means within the cardboard or corrugated boxes. This is typically achieved by providing a plurality of ventilation openings about the surfaces of the boxes. In this fashion cooled air can be circulated within the boxes, thereby maintaining the proper pulp temperature.

Once the bananas have reached the warehouse, the boxes are placed in ripening rooms where the pulp temperature is permitted to rise to about 60° to 62° F. Ethylene gas is also circulated about and within the containers by means of the ventilation openings. The combination of increased temperature and ethylene gas will hasten the ripening process, thereby reducing the time necessary for the bananas to fully ripen. Once this process has been completed, however, it is desirable to remove ethylene gas and decrease the temperature of the bananas in order to decelerate ripening. Since the ripening process within the bananas themselves releases ethylene gas, and since the ripening process will continue even at temperatures below 60° F., it is critical that sufficient ventilation be provided in order to reduce the pulp temperature and remove ethylene. Thus, once the bananas are removed from the ripening rooms and transported to the retailer, it is usually necessary to take steps to ensure that increased ventilation can be provided to the bananas. If the ethylene gas is not removed from the bananas or the temperature is not sufficiently decreased, the bananas will continue to ripen at an accelerated rate, thereby shortening their shelf life. Thus, the containers and packaging employed for bananas must be able to account for the varying ventilation and temperature control needs during the shipping and storing steps.

Other products, including other fruits and vegetables, require similar handling, and may have varying needs during the shipping and storing processes. Thus, there is a need for a container system for products, as well as a method for packing, shipping and storing these products, that will ensure proper shipping and storing conditions. While many of the containers and methods employed in the past have met the needs of producers and retailers, these containers and methods usually required a considerable amount of handling. Additionally, there is always a need for containers and packing methods which improve the shelf life, appearance, and freshness of perishable products such as fruits and vegetables.

SUMMARY OF THE INVENTION

It is an object of the present invention to provide a container system for shipping and storing products.

It is another object of the present invention to provide a container system for the shipping and storing of products, wherein inner and outer containers are provided, and wherein the inner container can be opened, without accessing the interior of the outer container or removing the container from a stack of containers, in order to provide increased ventilation to the products.

It is yet another object in the present invention to provide a container system for perishable products wherein said system comprises inner and outer containers, and wherein the inner container comprises a flexible bag that may be readily opened without opening the outer container.

It is still another object of the present invention to provide a container system for the shipping and storing of bananas wherein the container system comprises a rigid outer container having a plurality of ventilation openings and a central opening in its lid, and an inner bag having a plurality of ventilation openings vertically alignable with ventilation openings on the outer container, and wherein the inner bag may be opened to provide further ventilation to the bananas.

It is another object of the present invention to provide a method for producing a container of products such as fruits and vegetables.

It is yet another object of the present invention to provide a method for producing a container of perishable products, comprising the steps of inserting an inner bag into an outer container, placing the perishable products inside the inner bag, and closing the inner bag, wherein the inner bag can later be opened without accessing the interior of the outer container or removing the container from a stack, thereby increasing the ventilation to the perishable products.

It is an additional object of the present invention to provide a method of producing a container of banana clusters, wherein four rows of clusters are inserted into the container, with the two uppermost rows in a crowns-up configuration, thereby reducing the amount of bruising and scarring during shipment.

Additional objects, advantages and other novel features of the invention will be set forth in the description that follows, and will also be apparent to those skilled in the art upon examination of the following or may be learned with the practice of the invention.

The foregoing objects can be accomplished, in accordance with one aspect of the present invention, by providing a container system for the shipping and storing of product, comprising in combination:

(a) a substantially rigid outer container having at least one ventilation opening;

(b) a closable inner container positioned within the outer container for receiving the product, the inner container having a bottom portion and a top portion; and (c) means attached to the top portion of the inner container for opening the inner container so as to provide increased ventilation to the product.

The inner container preferably comprises a flexible bag having a sealed bottom as its bottom portion, an open top adjacent the top portion, and a perforation extending about at least a portion of the bag, and wherein the opening means opens the bag by severing the bag at the perforation. The perforation is preferably positioned between the top and bottom portions of the bag, adjacent the top portion, and preferably extends across substantially the entire width of the bag. The opening means preferably comprises a cord secured to the bag, preferably between the open top and the perforation such that when the cord is pulled the bag will tear at the perforation thereby opening the bag (by removing the top portion) and providing increased ventilation to the product through the ventilation opening in the outer container. The outer container may comprise a rectangular box having a top and at least one cord passageway, and a central ventilation opening in the top, wherein the cord extends through at least one cord passageway from the interior of the box.

The cord may be secured to bag by tying the cord about the circumference of the bag, thereby also closing and substantially sealing the top portion of the bag. In addition, the cord passageway may a hand slot for grasping the outer container, wherein the cord extends through this hand slot. The outer container may optionally have two such hand slots, and the cord may extend out both of these slots. The bag itself may also have a plurality of ventilation apertures positioned adjacent the bottom portion the bag. The bag may also be positioned within the outer container such that the top portion of the bag is positioned directly beneath the central opening in the top of the outer container, so that if the top portion of the bag is removed, the product will be exposed to the ambient through the central opening.

The foregoing objects may also be accomplished by providing a method of packing, shipping and storing product, comprising the steps of:

(a) providing an inner and outer container for the product at a first location, the outer container being of a substantially rigid construction, and having at least one ventilation opening, and wherein the inner container has a top portion, a bottom portion, and an open end adjacent the top portion;

(b) placing the inner container within the outer container;

(c) placing the product inside the inner container;

(d) providing a means attached to the top portion for opening the inner container;

(e) closing the inner container so that the inner container is substantially sealed at the top portion to thus containerize the product (f) shipping the containerized product to a second location;

(g) opening the inner container using the opening means, so as to provide increased ventilation to the product within the inner container through the at least one ventilation opening; and (g) storing the containerized product at the second location.

The inner container may comprise a flexible bag having a perforation between the top and bottom portions, so that the opening step severs the bag at the perforation, preferably removing the top portion of the bag, thereby providing the increased ventilation. The opening means may comprise a cord affixed to the top portion of the bag, so that the opening step comprises pulling the cord to remove the top portion of the bag. The outer container is preferably a rectangular box having a top and a central ventilation opening in the top, and the top portion of the bag can thus be positioned directly beneath the central ventilation opening prior to the opening step so that the opening step exposes the product to the ambient through the central opening. A portion of the cord is also preferably positioned external of the outer container so that the opening step can be accomplished without accessing the interior of the outer container.

The previously recited objectives can also be accomplished by providing a method of ventilating and storing a plurality of stacked boxes of product, said product contained in an inner container disposed within each of said boxes, said boxes being of a substantially rigid construction and having at least one ventilation opening; each of said inner containers having a top portion, and a bottom portion; each of said inner containers closed at said top portion; and said top portion of each of said inner containers having attached thereto a means for opening said inner container; comprising the steps of:

(a) opening said inner containers using said opening means, without opening said boxes, and without unstacking said boxes, so as to provide increased ventilation to said product within said inner containers through said at least one ventilation openings;

(b) storing said containerized product.

The foregoing objects can also be accomplished by providing a method of producing a container of banana clusters, comprising the steps of:

(a) providing inner and outer containers for said product, said outer container being of a substantially rigid construction and having at least one ventilation opening, and said inner container having a top portion and a bottom portion;

(b) placing said inner container within said outer container;

(c) placing said banana clusters within said inner container;

(d) closing said inner container at said top portion; and (e) providing a means for opening said inner container, said opening means attached to said inner container and operable from the exterior of said outer container.

The inner container may comprise a flexible bag having an area of weakness, such as a perforation, between said top and bottom portions, such that said opening means may be employed to open said bag at said area of weakness.

These objectives may also be achieved by providing a method of producing a container of banana clusters, comprising the steps of:

(a) providing a plurality of banana clusters, each of said clusters comprising a plurality of bananas connected to one another, each of said banana clusters having a tip portion and a crown portion;

(b) providing an outer container for said bananas, said outer container being of a rectangular construction having first and second parallel sidewalls, first and second parallel endwalls, and an interior bottom;

(c) placing a first row of banana clusters in said outer container atop said interior bottom, such that said bananas of said first row are positioned parallel to said endwalls;

(d) placing a second row of banana clusters in said outer container such that a portion of each banana cluster of said second row is positioned atop a portion of the bananas of said first row;

(e) placing a third row of banana clusters in said outer container, such that the tip portion of each banana cluster of said third row is snugly positioned between said second row of said banana clusters and said second sidewall; and (f) placing a fourth row of banana clusters in said outer container, such that the tip portion of each banana cluster of said fourth row is snugly positioned between said first row of said banana clusters and said first sidewall.

Various types of pads may be employed in this method in order to further protect the banana clusters, including: a tunnel pad, optionally employed in a flexible pouch; one or more inter-layer cushioning pads; dual tip cushioning pads; dual sidewall cushioning pads; or any combination of the above. These cushioning pads may also be employed in the crowns-down packing method of the prior art.

In most of the container systems and the methods described above, the product may be fresh produce (i.e., fruits and vegetables), such as bananas (preferably in the form of banana clusters, or hands).

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Reference will now be made in detail to the presently preferred embodiment of the invention, examples of which are illustrated in the accompanying drawings, wherein like numerals indicate the same elements throughout the views.

Figure 2:
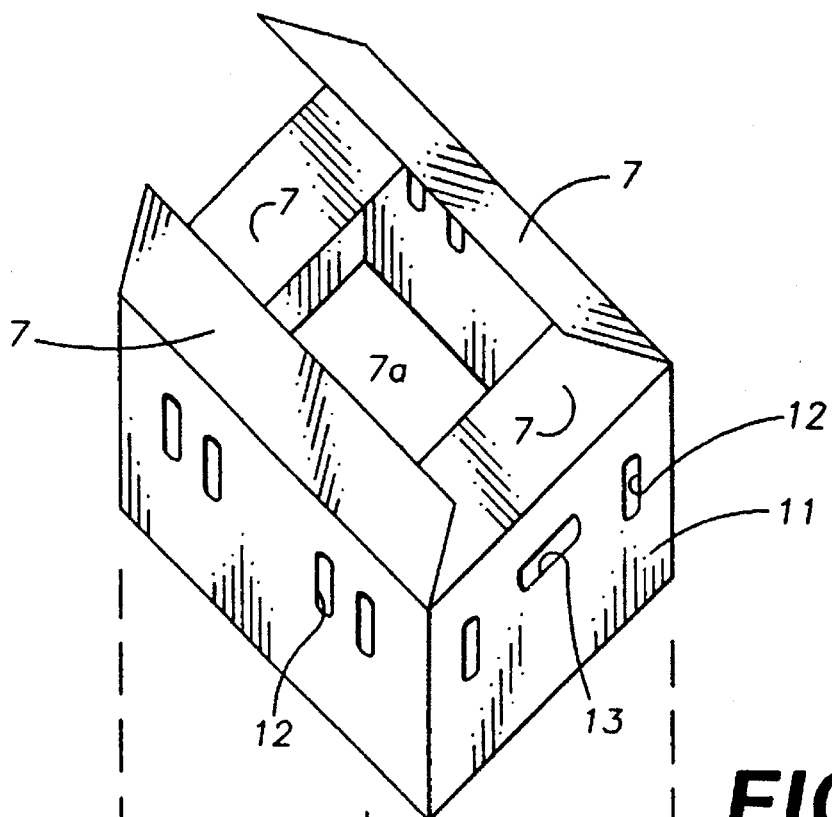
FIG. 2 is a perspective view of a prior art container used for shipping products such as fresh fruit and vegetables.
Figure 2:
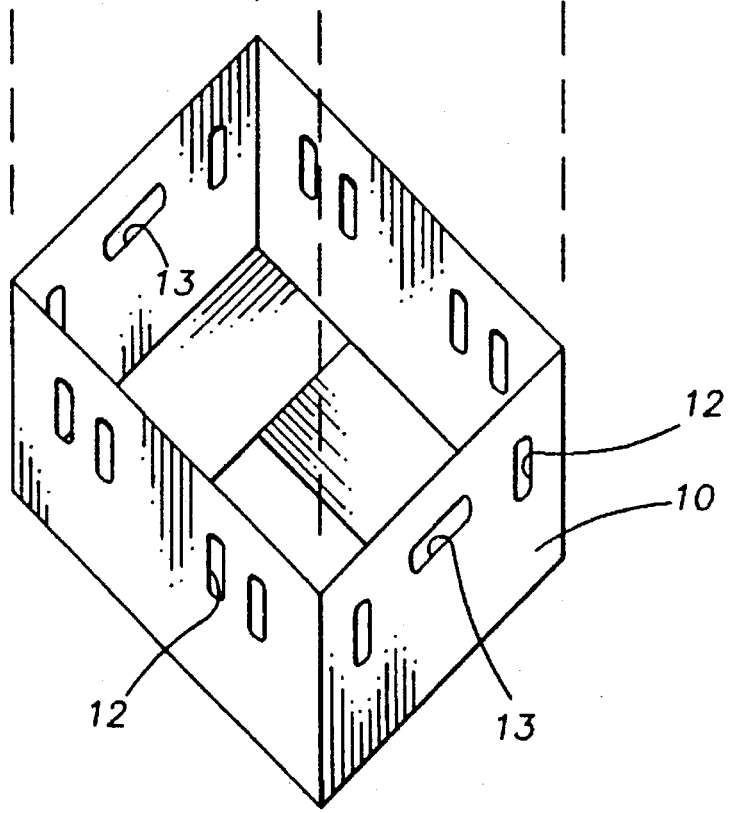

FIG. 2 depicts a prior art container commonly employed for shipping fresh fruits and vegetables such as bananas. The container of FIG. 2 generally comprises a base portion 10 and a top portion 11, and is commonly referred to as a full-telescoping, half-slotted container (HSC). Top portion 11 and base portion 10 are of approximately equal depth, and top portion 11 telescopically slides over base portion 10 to complete the container. Alignable ventilation apertures 12 are provided on the periphery of both portions of the container, as well as alignable hand slots 13 for grasping the container. Hand slots 13 also provide ventilation to the interior of the container. The top and bottom portions each have flaps which are folded over and glued to one another in order to close each portion. When these flaps are folded over, however, a central ventilation opening will be provided in both top portion 11 and bottom portion 10. Top portion 11, for example, has top flaps 7 which are folded over in the manner shown to define central ventilation opening 7a through which the product within the container will be visible.

Figure 10:
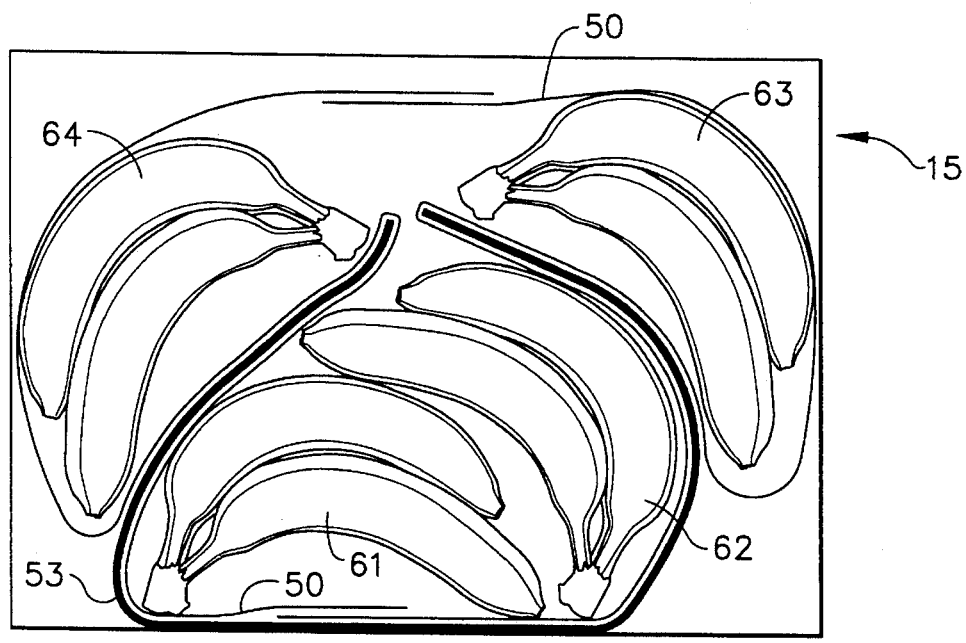
FIG. 10 is a cut-away view of one embodiment of the packing method of the present invention.

When perishable products such as bananas are shipped in the container of FIG. 2, a plastic inner wrap usually must be employed in order to protect the bananas. This inner wrap is typically a tube made of thin plastic, and has a series of ventilation slits provided about the entire surface of the tube. The plastic tube is typically placed in base portion 10, and the open edges of the tube are draped over the sidewalls of base portion 10. In this fashion, the bananas can then be layered within the tube which is contained in base portion 10. Once the bananas have been loaded into the plastic tube and base portion 10, the edges of the tube are merely draped atop the bananas in a loose fashion. Plastic inner tube 50 is shown in FIG. 10. In this manner, ventilation can be provided to the bananas through the ventilation slits, including the necessary circulation of ethylene gas to initiate the ripening process.

One drawback of the container of FIG. 2 when it is employed with the plastic tube referred to above, is that once the bananas arrive at the retail establishment, it is difficult to provide the necessary cooling and ventilation needed to retard the ripening process. The bananas will produce a considerable amount of heat and ethylene while they are ripening. If the bananas are not cooled back to a temperature of approximately 58° F., and if the ethylene gas is not permitted to escape from the container, the bananas will continue to ripen at an accelerated rate thereby reducing their shelf life.

In order to remove the excess heat and ethylene produced by the ripening bananas, the retailer must remove top portion 11, and open the inner plastic tube in order to expose the bananas. In this fashion, the heat and ethylene will be permitted to escape. Obviously, however, this necessitates removing the containers from their ordered arrangement on the pallets. The retailer must then restack the containers of bananas atop one another, usually in a staggered fashion, so that the necessary ventilation will be provided to the bananas. In fact, the retailer must often stack the containers in a less compact arrangement than was present when the containers were on the pallets, so that sufficient amounts of cooled air can be circulated about the bananas.

Figure 3:
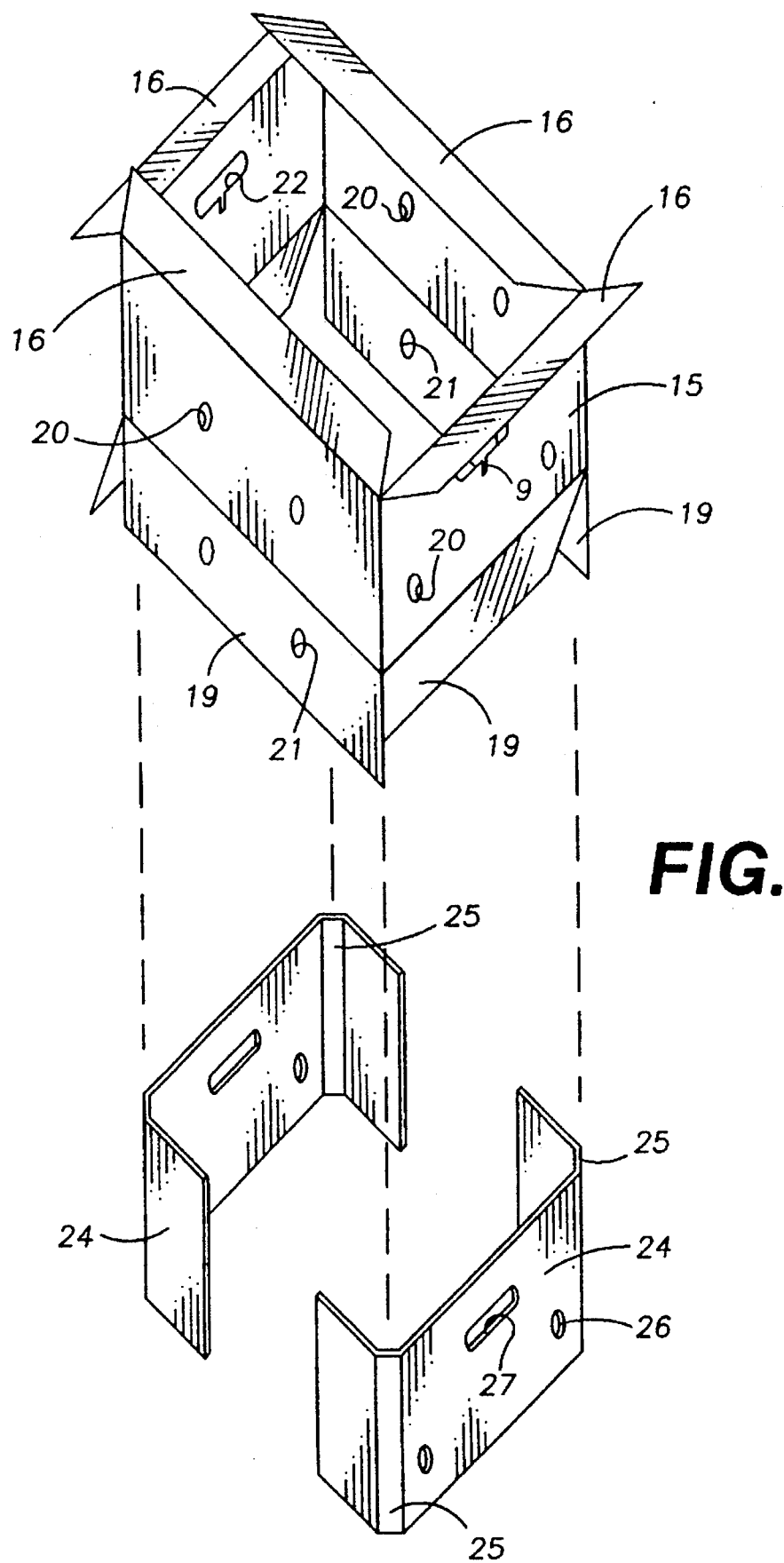
FIG. 3 is a perspective view of the outer container of one embodiment of the present invention.

FIG. 3 depicts an improved container design which offers numerous advantages over that shown by FIG. 2. Container 15 of FIG. 3 is similar in construction to base portion 10 of the prior art design shown in FIG. 2. Like any common rectangular container (i.e., a box), rectangular container 15 comprises four vertical sidewalls and attached bottom flaps 19. Bottom flaps 19 are folded over and glued in the conventional manner to thereby form the container. The width of bottom flaps 19 are such that the bottom of container formed by flaps 19 will not be a continuous surface. In other words, as is the usual case with containers wherein ventilation is important, a central opening will be provided in the bottom of container 15 when flaps 19 are folded over and sealed to one another in a conventional fashion (such as by gluing).

Container 15 also has a plurality of ventilation apertures 20 provided in its sidewalls, as well as ventilation apertures 21 provided in bottom flaps 19. Any number of ventilation apertures may be provided depending upon the product being shipped as well as considerations of container strength. As was the case in the container of FIG. 2, hand slots 22 are provided in the sidewalls of container 15, and the slots serve the dual purpose of providing added ventilation as well as a means for grasping the container.

Figure 5:
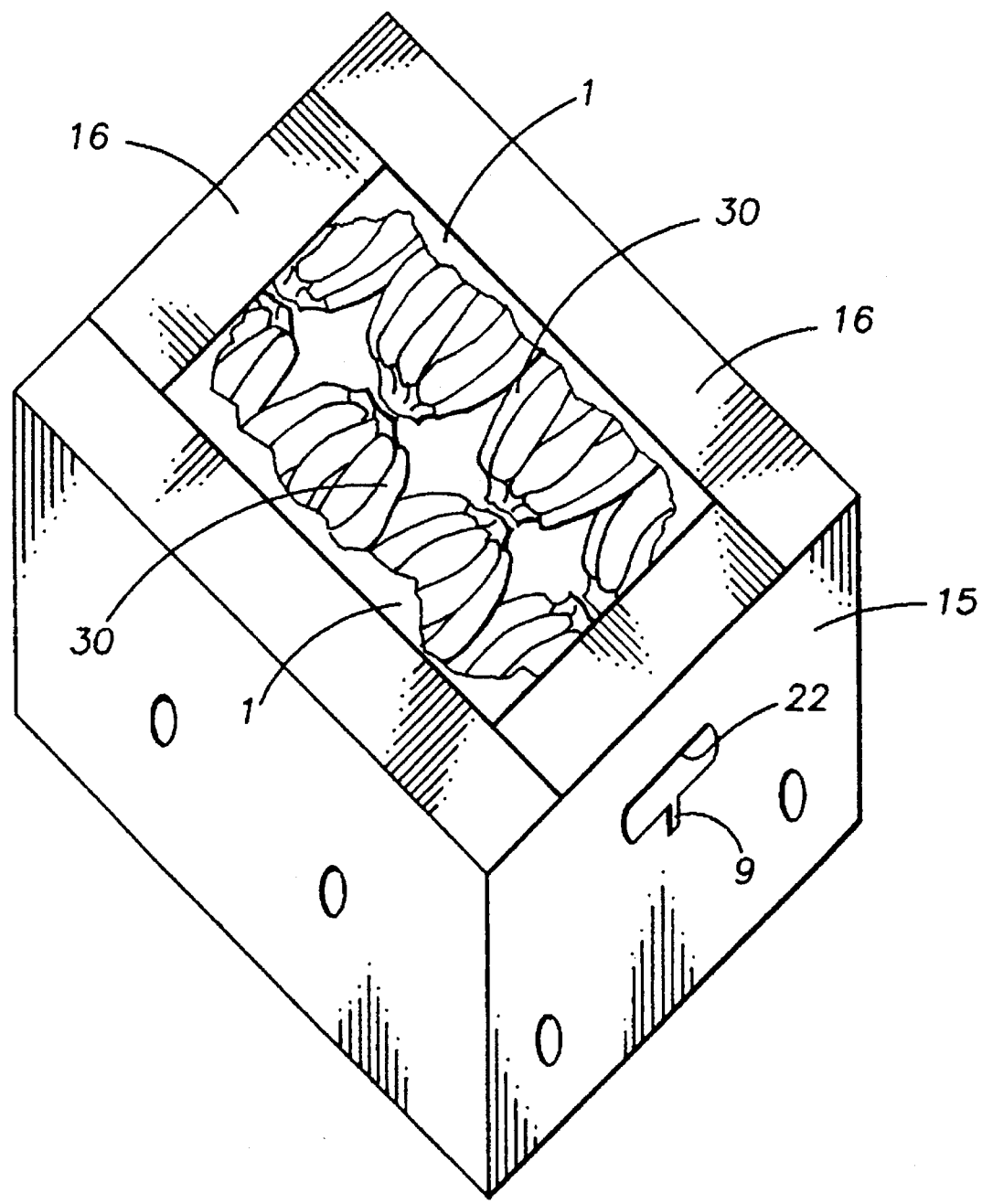
FIG. 5 is a perspective view of the container system of one embodiment of the present invention, after the inner bag has been opened.

Instead of a separate telescoping top portion as was the case in the container of FIG. 2, container 15 of FIG. 3 has integral top flaps 16. Once the products to be shipped are loaded within container 15, top flaps 16 are folded over in the conventional fashion and glued, much the same way that top flaps 7 on top portion 11 on the container of FIG. 2 would be. Top flaps 16 are preferably of a slightly shorter width, however, than top flaps 7 in FIG. 2. This provides a larger central ventilation opening, and therefore increased ventilation for the product. The central ventilation opening is shown by FIG. 5 as the area in the top of assembled container 15 through which the bananas 30 are visible. It has been found that an integral lid provides sufficient rigidity and strength, particularly when the insert to be described is employed.

The container of FIG. 3 also results in significant cost savings, since less material will be employed for the construction of the container (as compared to that of FIG. 2). Shipping containers such as those of FIGS. 2 and 3, are often made of corrugated board, and are generally disposed of after a single use. Thus, employing the container design of FIG. 2, even when the insert described below is employed, results in a significant reduction in the amount of disposed material.

In many instances, it may be necessary to reinforce container 15. Thus, as further shown in FIG. 3, support inserts 24 are preferably utilized. Inserts 24 fit within container 15 against the sidewalls and endwalls of the container. Obliquely angled corner portions 25 on support inserts 24 provide added support, as a stronger triangular structure will be situated in each corner of container 15 when inserts 24 are utilized. Optionally, a single support insert which fits against the entire interior sidewalls and endwalls may be employed, and the corner portions may optionally be of a right-angle configuration. When ventilation apertures 20 are provided in the sidewalls of container 15, corresponding alignable ventilation apertures 26 can be provided in inserts 24 so that unimpeded fluid communication to the interior of the container will be maintained. In addition, alignable hand slots 27 are also provided in support inserts 24 and ensure that hand slots 22 on container 15 can serve their intended dual purpose as previously described.

As stated previously, many products such as fruits and vegetables have varying ventilation and temperature requirements, and the prior art methods have been unable to effectively deal with these requirements. The plastic inner wrap or tubes utilized in the shipment of bananas, for example, require manual unstacking and restacking by the retailer, and do not provide the most protective environment for the bananas during shipment. In order to alleviate these problems, a novel inner container has been developed. While this inner container is preferably employed with the improved container design of FIG. 3, it can be effectively used with numerous other container or box designs, including that of FIG. 2.

Figure 1:
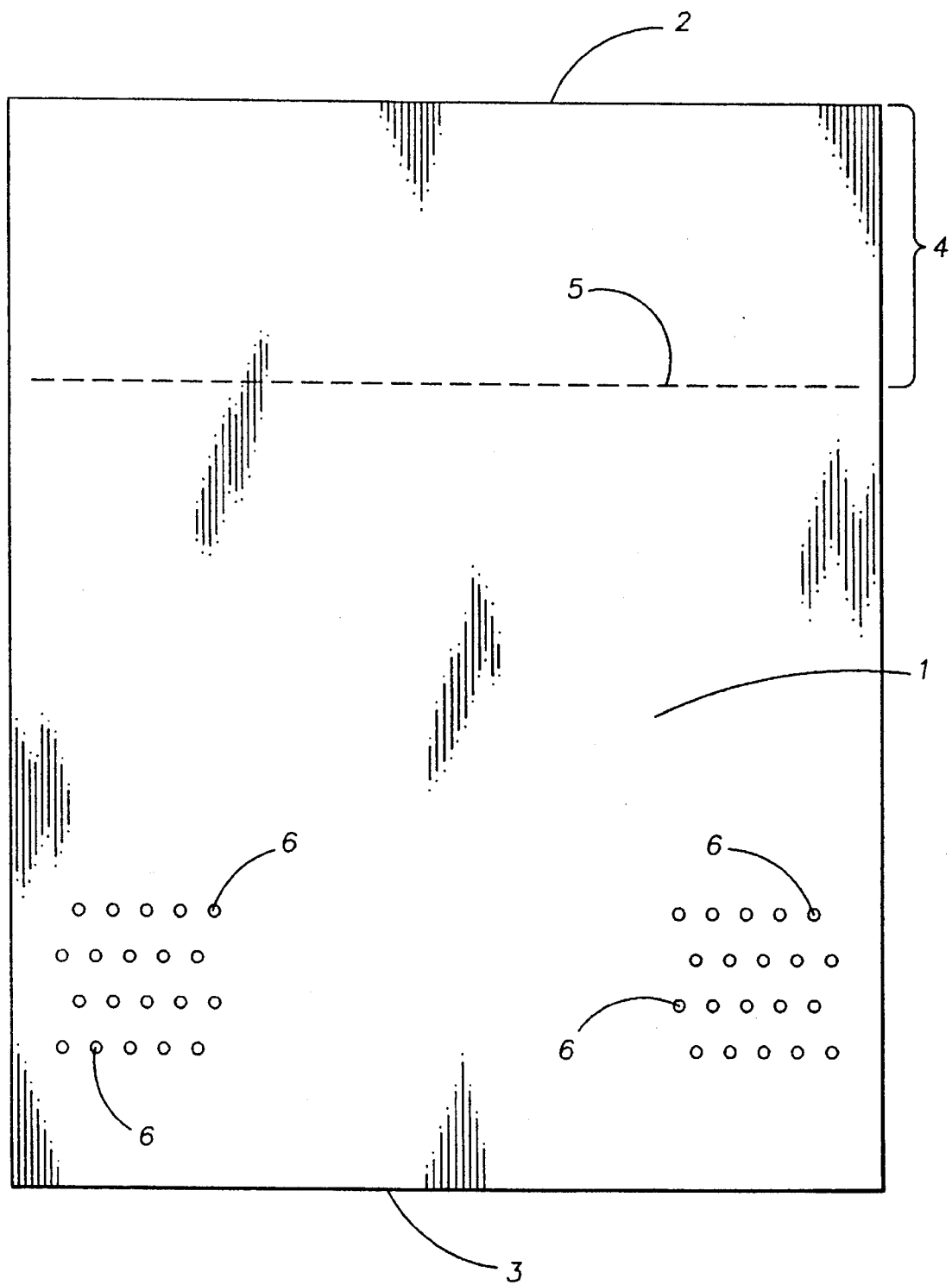
FIG. 1 is a side plan view of the inner bag of one embodiment of the present invention.
Figure 4:
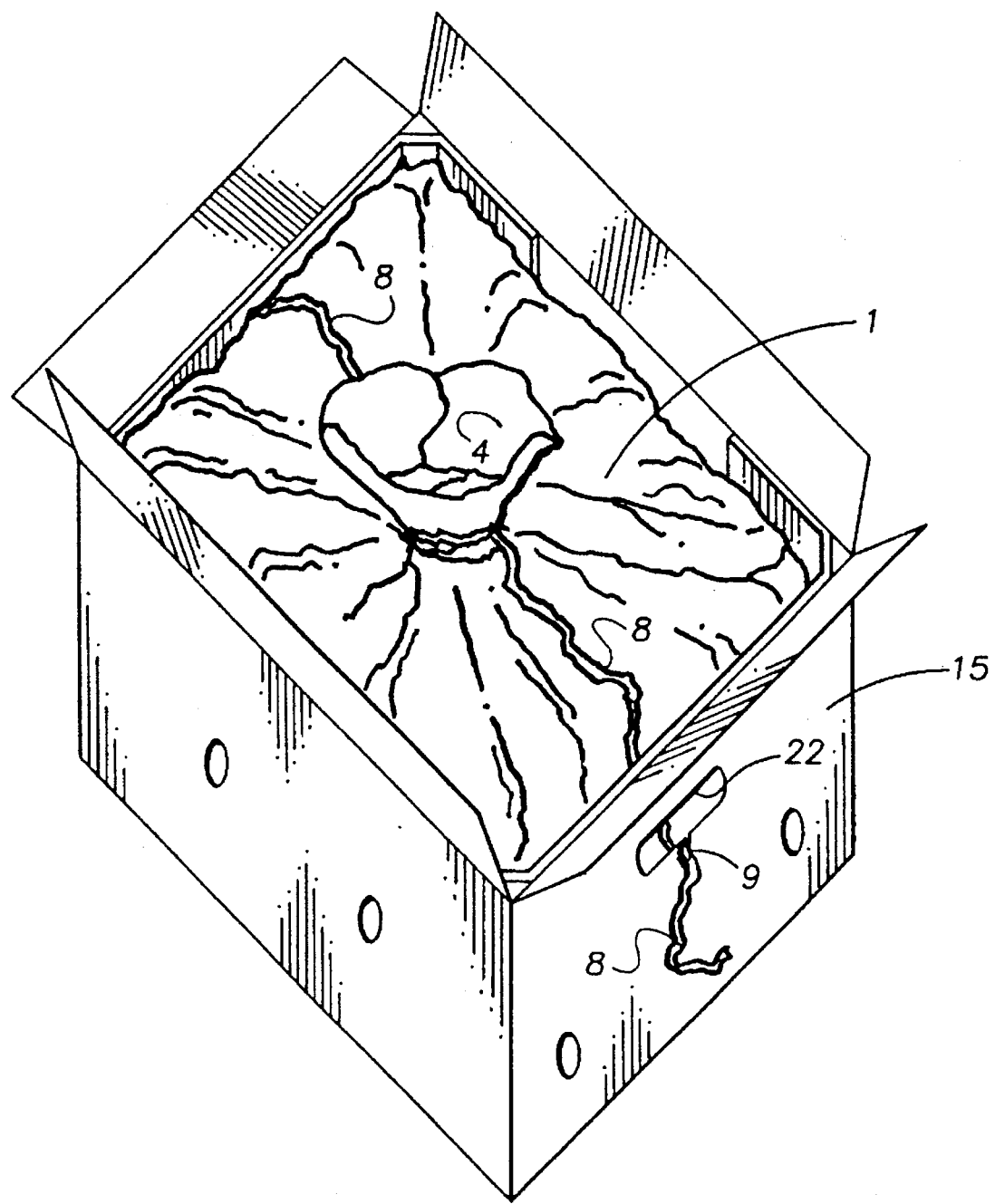
FIG. 4 is a perspective view of the container system of one embodiment of the present invention, wherein the outer container has not yet been closed.

FIG. 1 depicts the inner container of the present invention. The inner container preferably comprises a flexible bag 1 having an open end 2 and a sealed bottom end 3, and is identical in this respect to a typical household trash bag. Bag 1 can be constructed of any of a number of materials, and is preferably made of substantially clear, flexible plastic such as that typically used for plastic bags, however bag 1 could also be manufactured of opaque material. It should be noted that bag 1 is depicted in FIGS. 4 and 5 as opaque merely for clarity. The presently preferred material for bag 1 is linear low density polyethylene, having small amounts of additional additives to ensure that bag 1 may be easily opened and be of adequate strength, while maintaining its inexpensiveness. The exact formula for the material of bag 1 is not critical, and various combinations of materials well known to those skilled in the art can be readily employed.

Bag 1 differs from other plastic bags in that bag 1 also has a perforation 5 located adjacent top portion 4 of bag 1. Top portion 4 is defined as the area between open end 2 and perforation 5. As shown by FIG. 1, perforation 5 extends substantially across the entire width of bag 1, but not entirely. This ensures that when bag 1 is opened, for example, by sweeping the bag through the air to allow air to enter open end 2, such opening of the bag will not cause the bag to tear at perforation 5. In addition, a plurality of bags are usually manufactured on a roll, with individual bags separated by larger perforations between bags. Thus, perforation 5 only extends partially across the width of bag 1 so that when individual bags are removed from the role, the roll will tear between bags, rather than an individual bag tearing at perforation 5. As will be understood, perforation 5 can be replaced by any type of area of weakness. For example, bag 1 could be scored at the location where perforation 5 is now positioned. Alternatively, bag 1 could even be molded so that the area of weakness corresponds to a thin area in bag 1. Thus, perforation 5 can be replaced by any suitable area of weakness.

Bag 1 also has a plurality of ventilation apertures 6 located adjacent bottom end 3 at each corner of the bag. It should be noted that bag 1 is actually tubular in nature, and FIG. 1 depicts bag 1 in a flat form. Ventilation apertures 6 are preferably arranged in a series of rows, with the apertures in adjacent rows offset from one another in order to strengthen bag 1. If ventilation apertures 6 are not offset, the bag will be more likely to tear at the apertures. Preferably, bag 1 has twenty ventilation apertures 6 located adjacent each of the lower corners of the bag, or a total of eighty such apertures. The preferred positioning of ventilation apertures 6, as shown in FIG. 1, will help ensure that the apertures align properly with the various apertures on container 15 of FIG. 3.

Bag 1 of FIG. 1 is designed to be used with an outer container generally comprising a box typically made of cardboard, such as those of FIGS. 2 and 3, and preferably that of FIG. 3. In order to employ flexible bag 1, the container of FIG. 3 is first constructed by sealing bottom flaps 19 in their closed position, and preferably placing support inserts 24 within container 15. Bag 1 is then opened in the typical manner in which one would open a plastic bag (i.e., by forcing air into open end 2). Bag 1 is then inserted into container 15 with open end 2 of bag 1 extending out the top of container 15. Open end 2 is then draped about the outside of the sidewalls of container 15, thereby completely exposing the interior of bag 1 which is in place in container 15. The products to be packaged are placed within bag 1 which is positioned within container 15. When the product being loaded is a fresh fruit such as bananas (in the form of banana clusters as shown in FIG. 5), the product is often loaded within bag 1 and container 15 in an orderly fashion. For example, it is preferred that bananas be loaded into bag 1 in four layers or rows (as will be discussed in more detail later). The new packing method described later will ensure that the bananas will not extend above the sidewalls of container 15, and thus ensures that top flaps 16 can be sealed in the manner described previously.

Once the product has been loaded within bag 1, which is in place in container 15, top portion 4 of bag 1 is cinched together by hand in the manner one typically employs for plastic bags, such as a consumer might do with a plastic garbage bag. After top portion 4 of bag 1 has been cinched together by hand, there is a need to secure the cinched top portion in order to seal the bag closed. This is accomplished by providing cord 8. Cord 8 is preferably manufactured of polypropylene twine, however it can be manufactured of any of a number of materials including various fibers, and polypropylene twine is merely preferred for its strength and cost. Cord 8 is securely tied about cinched top portion 4 using any type of knot which will not become loosened when cord 8 is pulled. Thus, a simple square knot can be employed to securely cinch top portion 4 of bag 1 with cord 8. It is preferred that cord 8 be knotted about top portion 4 (i.e., between open end 2 and perforation 5) somewhere near the middle of the length of cord 8, and that cord 8 be of sufficient length so that each end of cord 8 may extend through each hand slot 22 of container 15 as shown by FIG. 4. In other words, when cord 8 is knotted about top portion 4 of bag 1, thereby sealing bag 1 shut, each end of cord 8 should extend through hand slots 22 located on opposite sidewalls of container 15.

It is also preferred that a small slit 9 be provided in the bottom of each hand slot 22 (as shown by FIG. 3), and a corresponding slit may also be provided on hand slot 27 of each insert 24 in the same location. When the ends of cord 8 extend out hand slots 22, a portion of cord 8 may be inserted within slit 9 (and the corresponding slits on inserts 24) in order to anchor cord 8 to container 15. This will ensure that the ends of cord 8 will remain outside of container 15 during transit. After cord 8 has been positioned in this fashion, top flaps 16 of container 15 may be folded over and secured in the manner described previously, thereby containerizing the product. Alternatively, cord 8 may be secured to top flaps 16 by an suitable means, such as a slit contained therein. For example, the process of producing the container 15 may result in the formation of hand slots in top flaps 16. Since these hand slots are not utilized in top flap 16, they may be only partially formed, and thus cord 9 can be secured within these partially-formed hand slots. The containerized product may then be stacked upon pallets in various commonly used patterns for shipping and/or storage. An additional feature of the system of the present invention is that since cord 8 extends out of each hands slot 22, cord 8 will generally be accessible even when a plurality of the containers are tightly positioned on a pallet, since most stacking patterns commonly employed will ensure that at least one hand slot 22 of each container 15 is located somewhere about the periphery of the pallet load readily accessible without requiring one to remove the containers from the pallet.

As an additional alternative, top portion 4 of bag 1 may be folded over in order to substantially seal bag 1 at top portion 4, and portions of closed bag 1 may then be positioned either adjacent to, or extending out from hand slots 22. In this fashion, bag 1 can be severed at perforation 5 merely by jerking the portion of bag 1 which is positioned near, or extends out from, hand slots 22.

As described previously, many products such as bananas require ventilation and/or temperature control in order to ensure that the goods arrive at their destination in a marketable condition. Many of these products also require varying amounts of ventilation during shipping. When goods such as bananas have been packaged in the fashion described above within sealed bag 1 placed within container 15, ventilation can still be provided to the bananas through ventilation apertures 6 on bag 1. When the preferred pattern for ventilation apertures 6 as shown by FIG. 1 is employed, at least a portion of ventilation apertures 6 will be substantially in vertical alignment with one or more ventilation apertures 20 and 21 on container 15. This permits cooling or heating air to be circulated amongst the bananas when necessary, and also will allow the ethylene gas used for ripening to enter bag 1 containing the bananas. Because the top portion of bag 1 is sealed, however, a "micro-climate" is created within bag 1. While ventilation apertures 6 in bag 1 permit air and ethylene to be circulated about the bananas, the sealed nature of bag 1 at top portion 4 significantly limits the amount of moisture which is lost to the environment.

The ability of the container system and method of the present invention to reduce the amount of moisture lost from the inner container is significant for the shipment of products such as bananas, as significant moisture losses usually take place when conventional packaging systems are employed. For example, bananas are typically packaged in 40 pound boxes. The 40 pound weight, however, refers to the weight of the bananas at the time of delivery to the retailer. Due to moisture losses during shipping, approximately 41.5 to 42.0 pounds of bananas must be packaged into each box prior to shipping. Since such a load of bananas conventionally packaged will lose up to two pounds of moisture, each box of bananas will arrive at the retailer weighing approximately 40 pounds, as required. When the packaging system and methods of the present invention are employed, however, moisture losses are reduced by approximately 0.5 pounds per box. Thus, the weight of the bananas packaged into the container system prior to shipping can be approximately 0.5 pounds less when the present invention is employed, as compared to conventional packaging systems. Additionally, since the number of full banana boxes which may be placed into the large shipping receptacles is limited by total weight, more loaded boxes of bananas can be placed within each receptacle, since each box of bananas will weigh approximately 0.5 pounds less when the packaging system of the present invention is employed. For the typical large shipping receptacle employed for bananas, the packaging system and methods of the present invention results in the ability to load approximately 28 more banana boxes into each shipping receptacle.

As also mentioned previously, once the boxes arrive at the retailer, or even at some other point in time, it may be necessary to significantly increase the amount of ventilation that can be provided to the product. This is particularly true for bananas, since, as mentioned previously, the retailer usually must increase the ventilation in order to slow the ripening process. At this point, cord 8 comes into play. When the retailer receives a shipment of loaded banana boxes, for example, the retailer merely firmly pulls cord 8 and top portion 4 of bag 1 is completely severed from the remainder of the bag due to perforation 5. Top portion 4 can then be readily pulled through hand slot 22, thereby completely removing top portion 4 of bag 1 from the box of bananas or other products. As shown by FIG. 5, this will completely expose the interior of bag 1 (in this case the load of bananas 30) through the central opening provided in the top of container 15. The remaining portion of bag 1 is also visible in FIG. 5 through the central opening. Thus, there is no longer a need for the retailer to open the boxes to provide further ventilation to the bananas. In fact, if sufficient ventilation can be provided to the boxes while they are on the pallet, there will no longer be a need for the retailer to unstack the banana boxes to increase the ventilation due to the increased size of the central ventilation opening in the top of container 15, thereby greatly reducing the amount of space needed for storage of the bananas and the labor required of the retailer. Additionally, since cord 8 is accessible without a need for the retailer to access the interior of container 15 (e.g., either by opening the container or reaching through the central opening of the container top), there is no need for the retailer to remove boxes from the pallet in order to open the inner container. Thus, the inner container may be opened even when a plurality of boxes are stacked atop one another.

Testing of the packaging system and methods of the present invention has also demonstrated that the reduction in moisture loss and the ability of the retailer to provide increased ventilation to the bananas will result in a marked improvement in the quality and appearance of the bananas. When bananas shipped in the conventional manner are placed side-by-side with those shipped using the container system and methods of the present invention, the improvements in product quality are readily apparent even to the unexperienced observer. The bananas have an overall fresher appearance and there is considerably less brown spotting on the bananas. This will, of course, result in greater consumer acceptance of the bananas.

Figure 6:
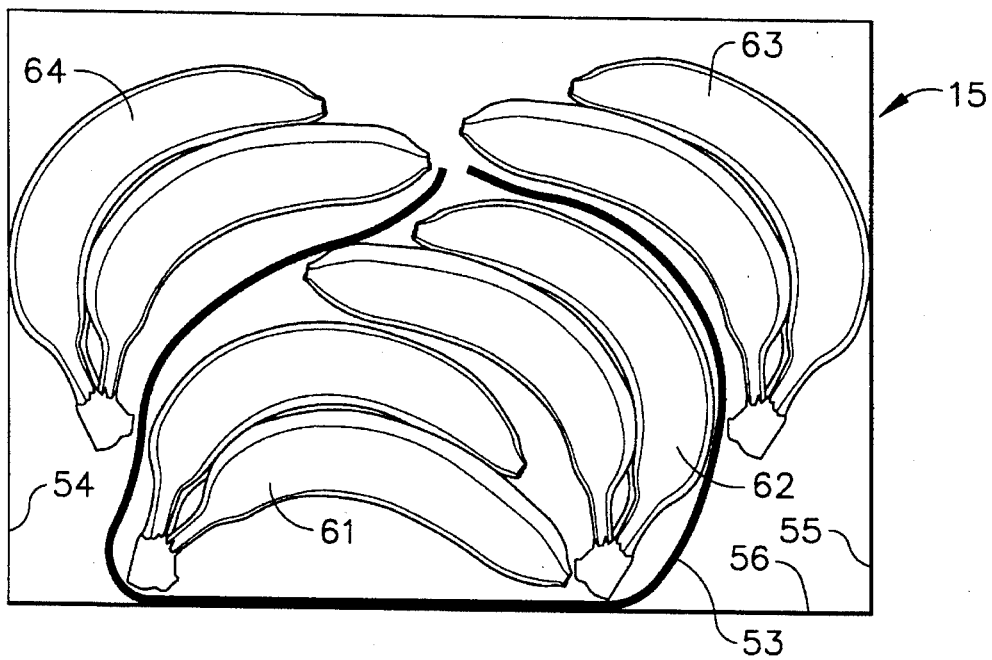
FIG. 6 is a cut-away view of prior art packing configuration for banana clusters.

The present invention also provides a new method of packing the bananas into the outer container (i.e., a method of producing a container of banana clusters). As mentioned previously, for many years bananas have been packaged in rectangular outer containers (boxes) in a four-layer (i.e., row) pattern. This traditional packing method is shown in FIG. 6. In fact, the boxes generally utilized for shipping bananas are all of identical dimensions, and are sized to provide just enough space for the four-row packing pattern of FIG. 6 wherein each row generally comprises 3–4 banana clusters each. The bananas of each row are positioned substantially perpendicular to the sidewalls of the box, and parallel to the endwalls of the box. As mentioned previously, an inner plastic tube is also typically employed, however the tube has been omitted from FIG. 6 for clarity.

Figure 15:
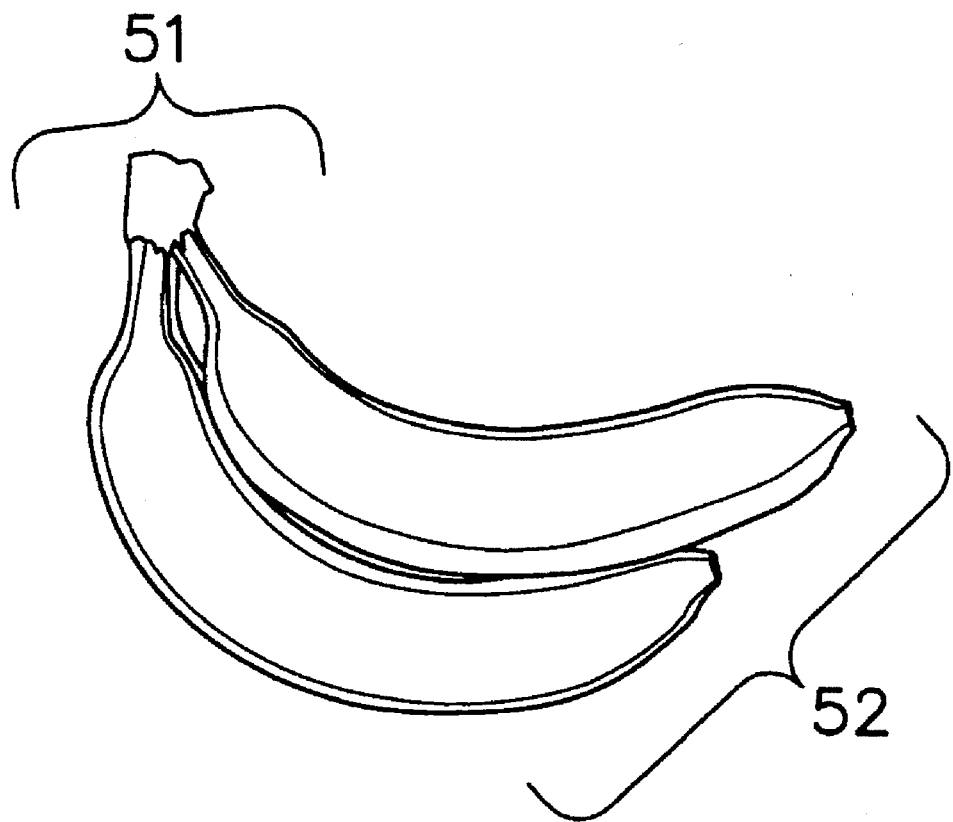
FIG. 15 is a side view of a banana cluster.

The packing method of FIG. 6 is readily accomplished in the following manner. It should first be noted that each banana cluster can be defined as having a crown portion 51 and a tip portion 52, as shown in FIG. 15. When employed, inner tube 50 is inserted into box 15, in the manner previously described. The use of inner tube 50 is depicted in FIG. 10, however it should be pointed out that the packing pattern of FIG. 10 is according to the present invention. An optional tunnel pad 53 may then be inserted into inner tube 50, or directly into box 15 if inner tube 50 is not employed. Tunnel pad 53 can, for example, be a rectangular sheet of Kraft paper, having a length at least as great as the length of first and second sidewalls 54 and 55, respectively. The tunnel pad should also have a width greater than the length of the endwalls 57 and 58 of box 15. Tunnel pad 53 is placed so as to extend length-wise between the endwalls of the box, and to extend width-wise across the interior bottom 56 and up side walls 54 and 55 of box 15 (due to its width being greater than the length of the endwalls). First and second rows 61 and 62, respectively, of banana clusters may then be inserted into box 15, within the inner tube when employed, and atop tunnel pad 53. If inner tube 50 is employed, it is preferable that tunnel pad 53 be inserted into box 15 prior to insertion of inner tube 50. In this fashion, the bananas will not directly contact tunnel pad 53, thereby reducing the amount of scarring on the bananas. After insertion of first row 61 and second row 62, the portion of tunnel pad 53 extending up side walls 54 and 55 may then be folded over the first and second rows of bananas, as shown in FIG. 6.

As further shown in FIG. 6, first row 61 is preferably positioned so that the crown portion of the banana clusters of first row 61 are nearer to side wall 54 than to side wall 55. The second row 62 of banana clusters is then inserted so that a portion of these banana clusters are positioned atop a portion of the banana clusters of first row 61, as shown in FIG. 6. The banana clusters will rest in the fashion shown in FIG. 6 due to the natural curvature of the bananas, provided that the clusters of the second row are oriented opposite those of the first row. Thus, as shown by FIG. 6, the crown portion of the banana clusters of second row 62 will lie adjacent the tip portion of the banana clusters of first row 61. This combination of first and second rows 61 and 62 is preferably centered between side walls 54 and 55, and both rows extend between the endwalls of box 15. For the size of box typically employed in the shipment of bananas, each row will typically comprise between about 3 and about 4 banana clusters each, in order to ensure that each row extends from endwall to endwall.

After tunnel pad 53 has been folded over the first and second rows of banana clusters, third row 63 and fourth row 64 of banana clusters are inserted into the box. Once again when inner tube 50 is employed, the bananas of the third and fourth rows are also preferably inserted into inner tube 50, in order to ensure that they do not directly contact tunnel pad 53. Third row 63 of banana clusters is inserted into the container such that the crown portion of each banana cluster of third row 63 will be positioned between second row 62 and second side wall 55. Likewise, fourth row 64 of banana clusters is inserted so that the crown portion of the fourth row will be positioned between first row 61 and first side wall 54.

Unfortunately, however, due to the nature of this packing method, not only will third and fourth rows 63 and 64 not be snugly secured in box 15, they will also generally extend above the top of box 15. In the past this problem has been remedied by employing a box such as that shown in FIG. 2. Since top portion 11 of the box design in FIG. 2 would telescope over base portion 10, this would ensure that the banana clusters of the third and fourth rows would be held within the box. During shipment, the bananas would tend to settle naturally due to vibrations, and top portion 11 of the box would begin to settle downward. Obviously, however, this would cause friction between the banana clusters of the third and fourth rows and the interior surfaces of top portion 11, thereby increasing the amount of bruising and other damage to the bananas. In addition, the crown portion of the banana clusters of third and fourth rows 63 and 64 would tend to rub against the bananas of second row 62 and first row 61, thereby further increasing scarring and bruising. While the tunnel pad would help in alleviating this problem, as well as reducing other friction points between the banana clusters, a rather thick tunnel pad was necessary (typically 61 or 69 Lb./M.S.F. when a Kraft paper tunnel pad was employed). While this would help reduce scarring caused by the crown portions of the third and fourth rows, the thickness of the tunnel pad itself would produce its own scarring on the fruit. Thus, while the tunnel pad would help reduce some of the damage to the bananas, it is certainly not an ideal solution.

Figure 7:
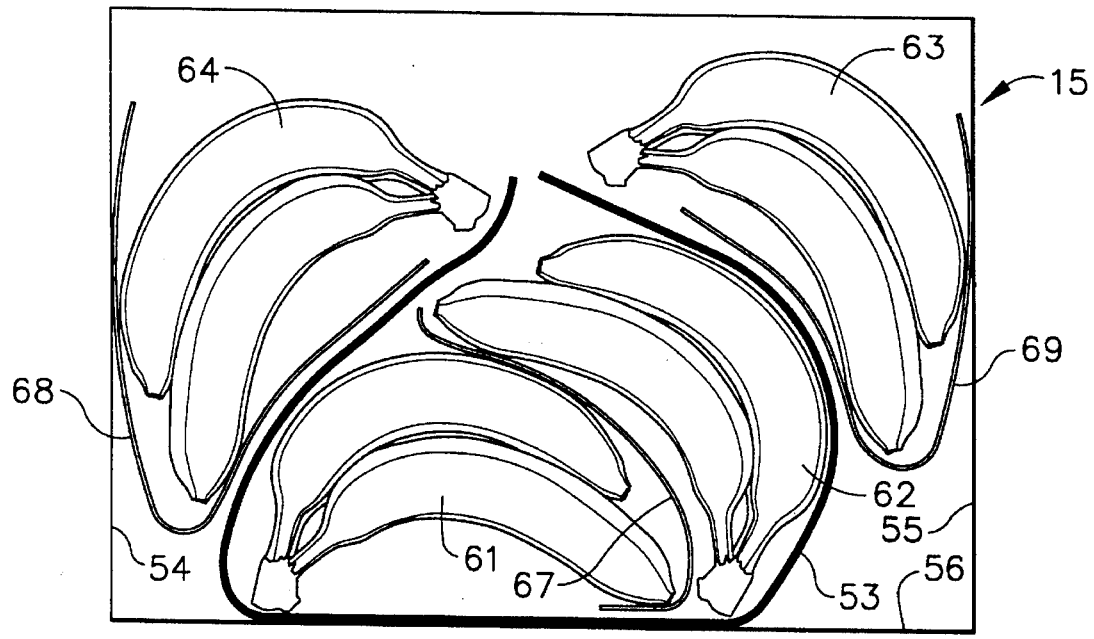
FIG. 7 is a cut-away view of one embodiment of the packing method of the present invention.

In light of the foregoing problems, applicants have developed a new packing method which has heretofore not been employed in the packaging of bananas. This new packing method allows one to use not only the prior art box designs of FIG. 2, but also boxes such as that shown in FIG. 5. While the boxes may be of the same exact dimensions of that used in the packing method of FIG. 6, this new packing method, as shown in FIG. 7, ensures a much more compact configuration for the bananas in the box. As shown in FIG. 7, applicant's new packing method essentially comprises placing third row 63 and fourth row 64 of banana clusters in a "crowns-up" configuration. In this manner the tip portion of third row 63 of banana clusters will be positioned between second row 62 of banana clusters and second side wall 55. By pressing the banana clusters of third row 63 downward slightly during packing, the tip portion of third row 63 will be snugly positioned between second row 62 and second sidewall 55. Because of the curvature of bananas near the crown portion, such snug positioning was heretofore not possible when using the "crowns-down" configuration of FIG. 6. Likewise, the tip portion of fourth row 64 of banana clusters is snugly positioned between first row 61 and side wall 54, as shown in FIG. 7. By producing a container of banana clusters in this fashion (i.e., a method of packing bananas), the crown portions of third row 63 and fourth row 64 will no longer rub against second row 62 and first row 61. This, in turn, allows the use of a much thinner, and therefore softer, tunnel pad. For example, the Kraft paper utilized for the tunnel pad will be reduced to one having a strength of 42 Lb./M.S.F. The use of a thinner and therefore softer, tunnel pad provides further benefits in that less friction will be produced, and therefore less scarring of the bananas will occur. In addition, by using this new packing method, the bananas will no longer extend above the top of box 15 after packing, even though an identically-sized box is employed in FIG. 7 as compared to FIG. 6. It should be noted for sake of clarity that the packing method shown in FIG. 6 is the configuration after the bananas have settled, and therefore the bananas in FIG. 6 are not shown extending above the top of box 15, even though this would normally be the case immediately after packing.

In addition, since the bananas of FIG. 7 are snugly held in place, as previously described, the bananas will not vibrate nearly as much as in the previous method. This in turn results in even less bruising and scarring of the bananas, and furthermore helps alleviate the problem of neck damage which can lead to latex seepage around the crown portion of the banana clusters. Testing has clearly shown that consumers prefer bananas having a minimal amount of scarring or bruising, and little, if any, latex seepage. Applicants' testing of the new packing method has shown remarkable results in this regard, and the reductions in bruising, scarring, and latex seepage have been quantitatively measured, and are significant.

Figure 8:
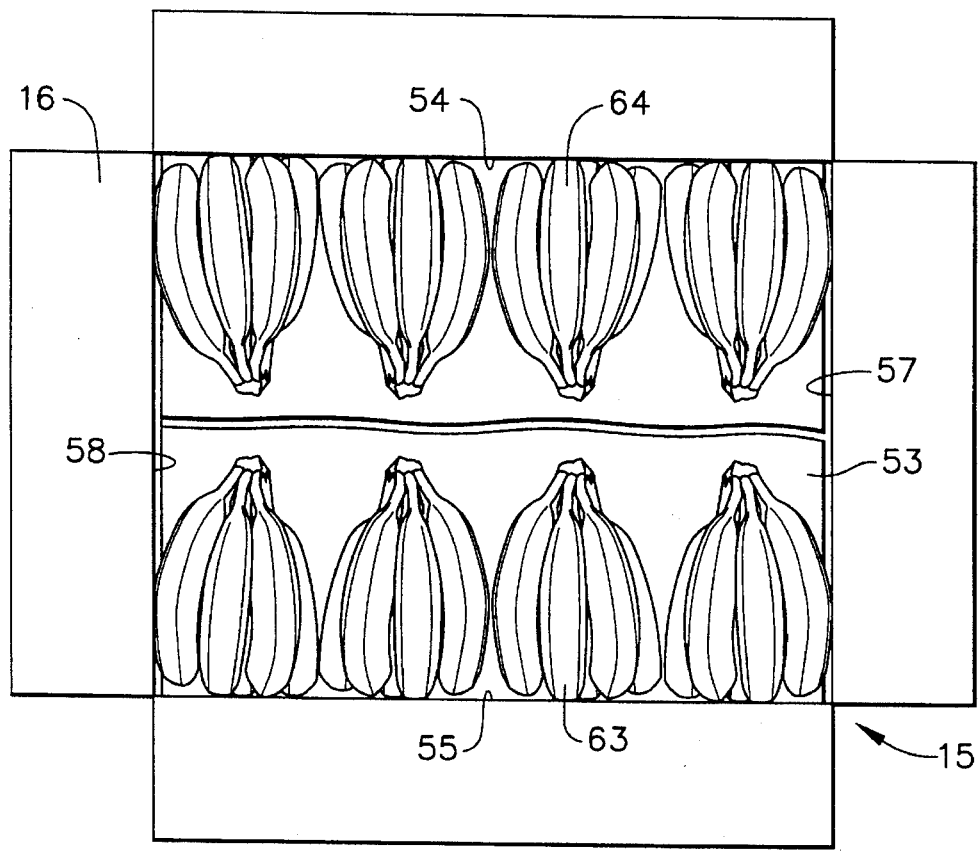
FIG. 8 is a top plan view of one embodiment of the packing configuration of the present invention.

While a new packing method can be used in the prior art box design of FIG. 2, it is preferably that the new box design of FIG. 3 be employed. In addition, it is also preferably that tunnel pad 53 (as previously described) also be employed in order to offer further protection. In fact, FIG. 8 depicts a top plan view of a container of banana clusters produced according to one embodiment of the present invention. As will be noted in FIG. 8, the banana clusters of third row 63 and fourth row 64 extend substantially perpendicularly away from side walls 54 and 55, and are positioned substantially parallel to end walls 57 and 58. As also shown in FIG. 8, the bananas are positioned atop tunnel pad 53, and therefore the clusters of first row 61 and first row 62 are not visible in FIG. 8.

Figure 9:
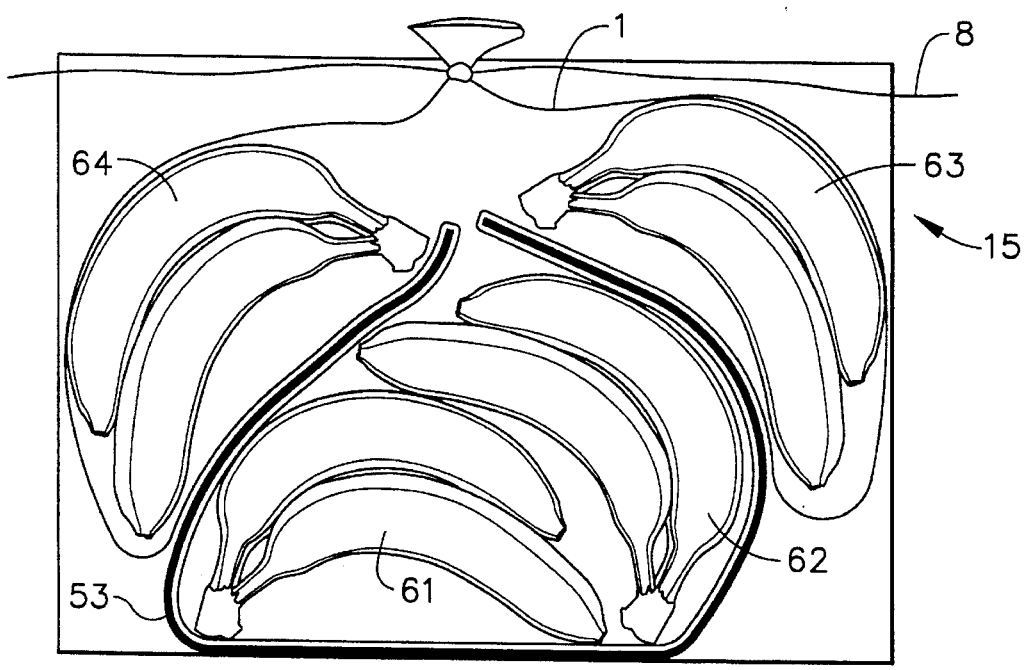
FIG. 9 is a cut-away view of one embodiment of the packing method of the present invention.

While the packing method of FIGS. 7 and 8 may readily be employed using the inner plastic tube described previously, it is preferred that bag 1 (as previously described) be employed in conjunction with the new packing method. This is best shown by FIG. 9, where bag 1 having cord 8 as an opening means, is employed. As also shown in FIG. 9, it is preferable that tunnel pad 53 be disposed within box 15, but not within bag 1. In this manner, bag 1 prevents the banana clusters from directly contacting tunnel pad 53, thereby eliminating the possibility of friction between tunnel pad 53 and the banana clusters.

Although the new packing method the applicants have invented offers significant and remarkable reductions in fruit damage, applicants have also discovered that several types of cushioning pads may additionally be employed. Initially, it should be pointed out that tunnel pad 53, while preferably made of Kraft paper, can also be made of numerous other materials such as polyethylene foam pads and the like. As shown in FIGS. 7, an inter-layer cushioning pad 67 can be disposed between first row 61 and second row 62. Preferably, a portion of inter-layer cushioning pad 67 is also positioned between the tip portion of first row of banana clusters 61 and internal bottom 56 of box 15. Inter-layer cushioning pad 67 will reduce the amount of friction between first row 61 and second row 62, and also between the tip portion of first row 61 and internal bottom 56 of box 15. This latter feature offers benefits even when tunnel pad 53 and bag 1 are employed. Inter-layer cushioning pad 67 is preferably rectangular in nature having a length approximately equivalent to the length of side walls 54 and 55. The width of inter-layer cushioning pad should be chosen in order to insure proper alignment of pad 67 between first row 61 and second row 62, as herein described.

As also shown in FIG. 7, first and second tip cushioning pads 68 and 69, respectively, can also be provided. Tip cushioning pads 68 and 69 preferably have a length approximately equal to the length of side walls 54 and 55. First tip cushioning pad 68 is inserted in the manner shown in FIG. 7, so as to form a trough between first row 61 and first side wall 54. The tip portion of fourth row banana clusters 64 can then be inserted into the trough formed by first tip cushioning pad 68, thereby providing additional protection for both fourth row 64 and first row 61. Second tip cushioning pad 69 is inserted in an identical fashion on the opposite side of box 15 to also form a trough between second row of banana clusters 62 and second side wall 55. It should be noted that identical cushioning pads can also be employed with the prior art packing method of FIG. 6, however in that case they would be more appropriately referred to as first and second crown cushioning pads. In fact, inter-layer cushioning pad 67 can likewise be employed in the prior art packing method of FIG. 6, and applicants present invention is considered to include such an embodiment.

Figure 14:
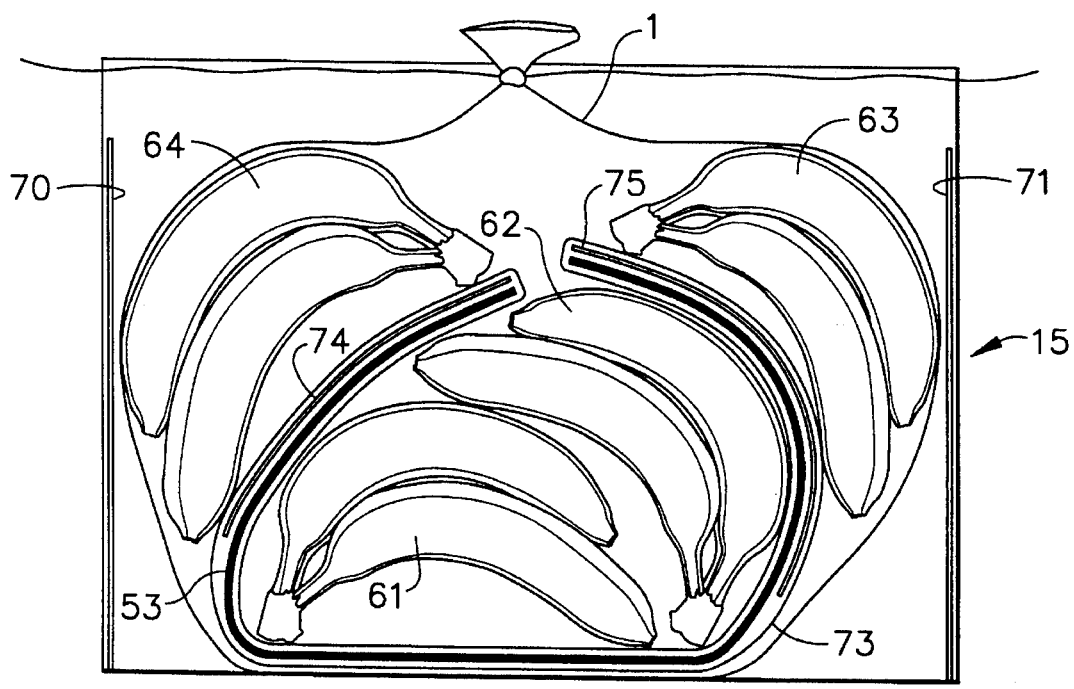
FIG. 14 is a cut-away view of one embodiment of the packing method of the present invention.

As an alternative to tip (or crown) cushioning pads, first and second sidewall cushioning pads 70 and 71 may be employed, as shown in FIG. 14. First and second sidewall conditioning pads 70 and 71 are preferably rectangular in nature, having a length approximately equal to the length of sidewalls 54 and 55, and a height approximately equal to the highest point along the interior of sidewalls 54 and 55 which the bananas of fourth row 64 and third row 63 contact. In other words, first and second sidewall cushioning pads 70 and 71 preferably extend at least about two-thirds the height of box 15. These sidewall conditioning pads will help insure that the tip portion of third row 63 and fourth row 64 of banana clusters will not be bruised or scarred during shipment. If desired, identical endwall cushioning pads may also be provided, however these would normally not be necessary.

Figure 11:
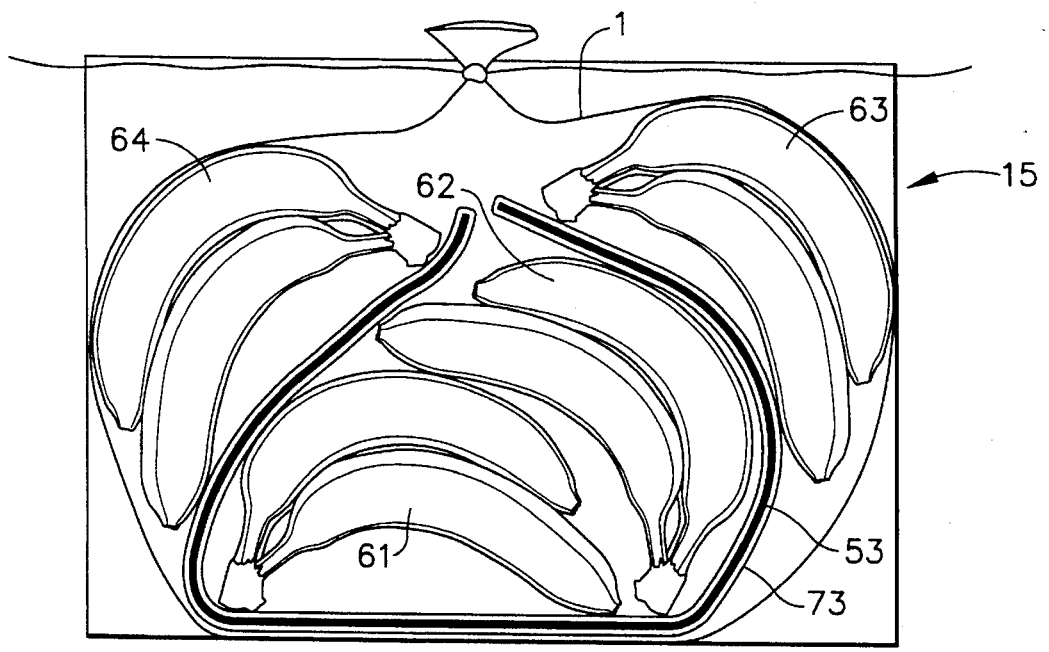
FIG. 11 is a cut-away view of one embodiment of the packing method of the present invention.
Figure 12:
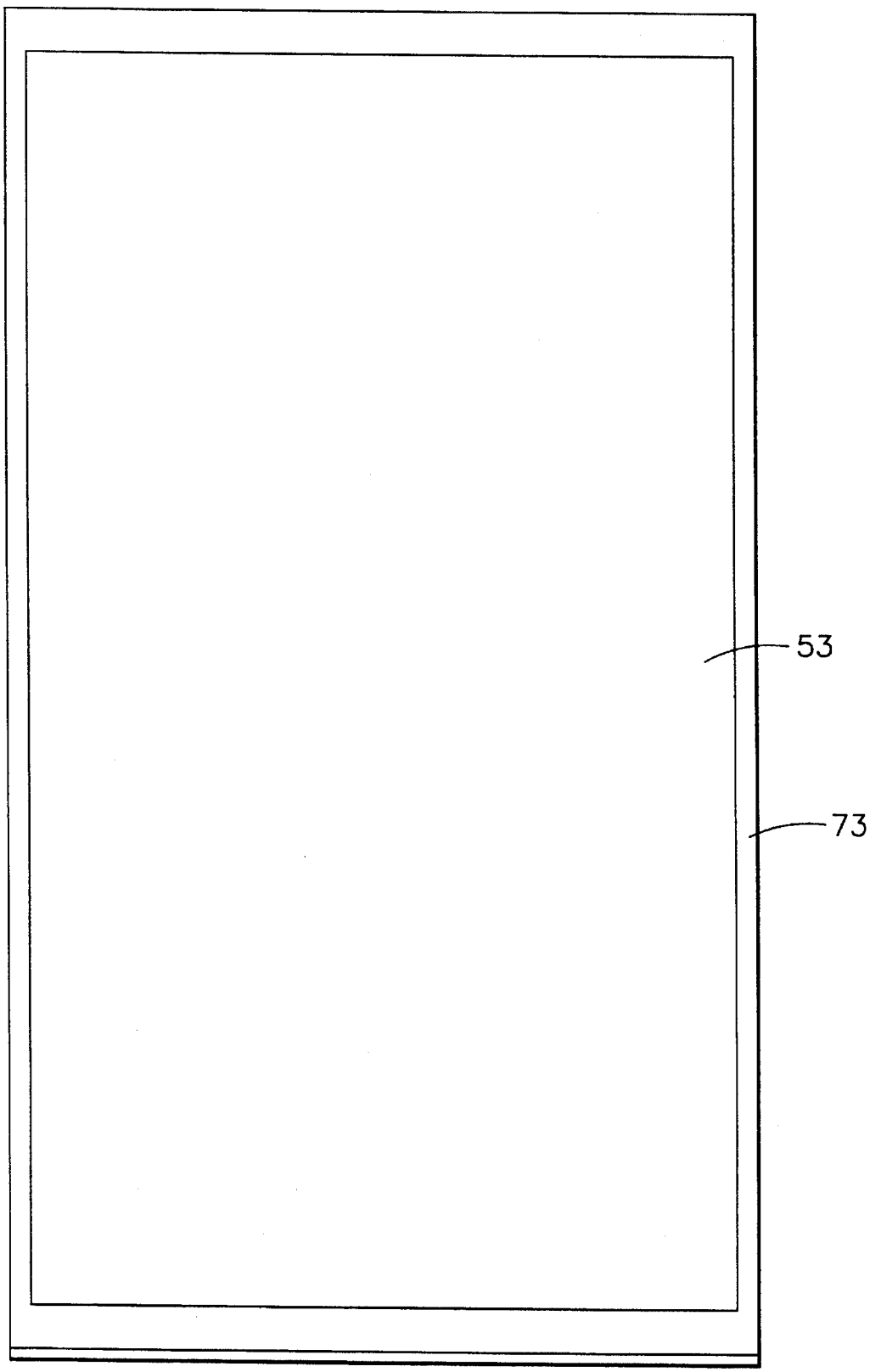
FIG. 12 is a side plan view of the tunnel pad pouch utilized in one embodiment of the present invention.
Figure 13:
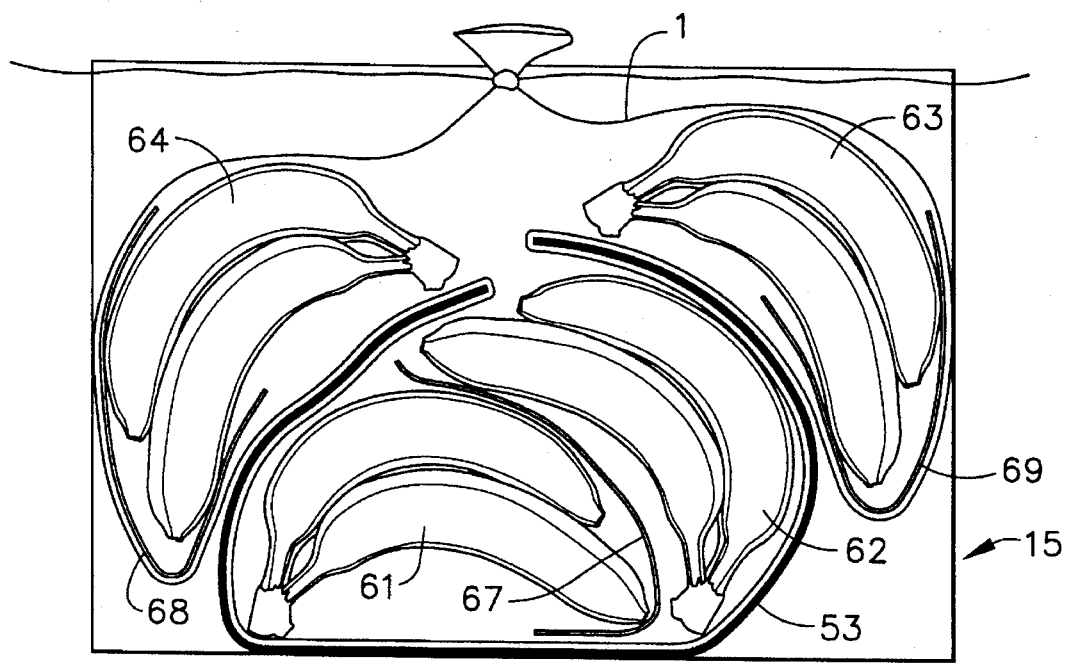
FIG. 13 is a cut-away view of one embodiment of the packing method of the present invention.

As stated previously it is preferable that tunnel pad 53 be positioned externally from the inner container employed, whether this inner container be bag 1 or inner tube 50. If desired, however, a tunnel pad pouch 73 may be employed to permit tunnel pad 53 to be inserted within the inner container. Tunnel pad pouch 73, as best shown in FIG. 12, is preferably slightly larger than tunnel pad 53, so that tunnel pad 53 can be inserted into pouch 73. Pouch 73 is preferably made of a flexible plastic material such as the type used for bag 1. Pouch 73 will isolate tunnel pad 53 from the high moisture environment of the inner container, thereby maintaining the integrity of tunnel pad 53. In addition, pouch 73 will also help prevent damage of the fruit caused by direct contact with tunnel pad 53. When pouch 73 is employed, the only difference between the previously-described preferred embodiments is that tunnel pad 53 contained within pouch 73 is inserted after bag 1 or inner tube 50 has been inserted into the outer container. In this fashion, tunnel pad 53 contained within pouch 73 will be disposed within whatever inner container is employed. Thus, the rows of banana clusters will directly contact pouch 73, and will not contact tunnel pad 53, as best shown in FIG. 11. It should also be pointed out that the use of pouch 73 will enable one to utilize either a shorter bag 1 or a shorter inner tube 50 as the inner container.

Finally, additional inter-layer cushioning pads 74 and 75 may be employed as shown in FIG. 14. Inter-layer cushioning pad 74 is preferably positioned between forth row of banana clusters 64 and first row of banana clusters 61. In addition, a portion of inter-layer cushioning pad 74 is preferably positioned between the crown portion of fourth row 64 and the tip portion of second row 62. Likewise, inter-layer cushioning pad 75 is preferably positioned between third row of banana clusters 63 and second row of banana clusters 62. As further shown by FIG. 14, inter-layer cushioning pads 74 and 75 are preferably disposed within pouch 73 when this pouch is employed. If pouch 73 is not employed, however, and tunnel pad 53 is positioned on the exterior of the inner container, inter-layer cushioning pads 74 and 75 may nevertheless be placed in the location shown in FIG. 14. In this latter embodiment, therefore, inter-layer cushioning pads 74 and 75 will directly contact the rows of banana clusters. Inter-layer cushioning pads 74 and 75 may be sized in the manner described for pad 67.

In all of the cases described above utilizing the various cushioning pads, it should be noted that these pads can be made of any of a number of materials. The presently preferred material, however, is polyethylene foam. It is also presently preferred that these polyethylene foam pads have a density of about one pound per cubic foot, and a thickness of about $1/32$". Obviously, however, there are any of a number of materials from which these pads could be produced, and applicants' present invention is not limited to only polyethylene foam. In addition, the various cushioning pads described above can be combined in any of a number of fashions. Thus, as shown in FIG. 7, first and second tip cushioning pad 60 and 69 can be employed along with inter-layer cushioning pad 67, for example. Likewise, as shown in FIG. 14, the first and second side wall conditioning pad 70 and 71 can be employed along with inter-layer cushioning pads 74 and 75.

The foregoing description of a preferred embodiment is by no means exhaustive of the variations in the present invention that are possible, and has been presented only for purposes of illustration and description. Obvious modifications and variations will be apparent to those skilled in the art in light of the teachings of the foregoing description. For example, various alternative means for tearing open the inner container could be employed, such as tabs molded into the inner container itself. Additionally, it is certainly within the scope of the present invention to use an alternative means for sealing the inner container. For example, a pull cord can be secured to the container, and a separate sealing means employed. Additionally, various alternative materials could be used to manufacture the various components of the system and method. Thus, it is intended that the scope of the present invention be defined by the claims appended hereto.

What we claim is:

1. A method of ventilating and storing a plurality of stacked boxes of produce, said produce contained in an inner container disposed within each of said boxes, said boxes being of a substantially rigid construction and having at least one ventilation opening;

each of said inner containers having a top portion, and a bottom portion;

each of said inner containers closed at said top portion; and said top portion of each of said inner containers having attached thereto a means for opening said inner container;

comprising the steps of:

(a) opening said inner containers using said opening means, without opening said boxes, and without unstacking said boxes, so as to provide increased ventilation to said produce within said inner containers through said at least one ventilation openings;

(b) storing said containerized produce.

2. The method of claim 1, wherein each of said inner containers comprise a flexible bag having a perforation between said top and bottom portions, and wherein said opening step severs said bag at said perforation.

3. The method of claim 2, wherein said opening step removes a portion of each bag, thereby providing said increased ventilation.

4. The method of claim 3, wherein said opening means comprises a cord affixed to said top portion of each of said bags, and wherein said opening step comprises pulling said cord to remove said top portion of said bags.

5. The method of claim 4, wherein each of said boxes has a top and a central ventilation opening in said top, and wherein said top portion of each of said bags is positioned beneath said central ventilation opening so that said opening step exposes said product to the ambient through said central opening, thereby providing said increased ventilation.

6. The method of claim 5, wherein at least a portion of each of said cords is positioned external of said boxes so that said opening step can be accomplished without accessing the interior of said boxes.

7. The method of claim 6, wherein said produce is a plurality of banana clusters.

8. A method of producing a container of banana clusters, comprising the steps of:

(a) providing inner and outer containers for said banana clusters, said outer container having a top wall, bottom wall and side walls and being of a substantially rigid construction and having at least one ventilation opening, and said inner container having a top portion and a bottom portion;

(b) placing said inner container within said outer container;

(c) placing said banana clusters within said inner container;

(d) closing said inner container at said top portion; and (e) providing a means for opening said inner container, said opening means attached to said inner container and being positioned such that said opening means is accessible from the exterior of said outer container through a side wall of said outer container and such that said inner container is openable to provide increased ventilation without opening said outer container and while said inner and outer container is in a stacked array of inner and outer containers.

9. The method of claim 8, wherein said inner container comprises a flexible bag having an area of weakness between said top and bottom portions, such that said opening means may be employed to open said bag at said area of weakness.

10. The method of claim. 9, wherein said opening means comprises a cord, and wherein said closing of said inner container is accomplished by securing said cord about the top portion of said bag.

11. The method of claim 10, wherein said outer container is a rectangular box having a top and a ventilation opening in said top, and wherein said bag is placed in said outer container so that said top portion of said bag is positioned beneath said central ventilation opening.

12. The method of claim 11, further comprising the step of positioning at least a portion of said cord outside of said outer container.

13. The method of claim 9, wherein said outer container has first and second parallel sidewalls, first and second parallel endwalls, and an interior bottom; wherein each of said banana clusters comprises a plurality of bananas connected to one another, each of said banana clusters having a tip portion and a crown portion; and wherein said step of placing said banana clusters within said inner container comprises the following steps:

(a) placing a first row of banana clusters in said inner container atop said interior bottom of said outer container, such that said bananas of said first row are positioned parallel to said endwalls;

(d) placing a second row of banana clusters in said inner container such that a portion of each banana cluster of said second row is positioned atop a portion of the bananas of said first row;

(e) placing a third row of banana clusters in said inner container, such that the tip portion of each banana cluster of said third row is snugly positioned between said second row of said banana clusters and said second sidewall; and (f) placing a fourth row of banana clusters in said inner container, such that the tip portion of each banana cluster of said fourth row is snugly positioned between said first row of said banana clusters and said first sidewall.

14. A method of producing a container of banana clusters, comprising the steps of:

(a) providing a plurality of banana clusters;

(b) providing inner and outer containers for said banana clusters;

said outer container being of a substantially rigid, rectangular construction, and having a top wall, bottom wall, sidewalls, and at least one ventilation opening in said top;

said inner container comprising a flexible bag having a top portion. a sealed bottom portion, an open end adjacent said top portion, and a perforation between said top and bottom portions adjacent said top portion;

(c) placing said bag within said outer container such that said top portion is positioned beneath said ventilation opening;

(d) placing said banana clusters within said bag;

(e) closing said bag by means of a cord tied about the periphery of said top portion in order to substantially seal the top portion of said bag to thus containerize said bananas; and (f) positioning said cord such that the cord is accessible from the exterior of a sidewall of said outer container, such that said bag may be severed at said perforation by pulling said cord in order to provide increased ventilation to said banana clusters through said ventilation opening without opening said outer container and while said inner and outer container is in a stacked array of inner and outer containers.

15. A method of packing, shipping and storing bananas, comprising the steps of:

(a) providing an inner and outer container for said bananas at a first location, said outer container being of a substantially rigid, rectangular construction, and having a top, a bottom, a plurality of sidewalls, and at least one ventilation opening in said top, and wherein said inner container comprises a flexible bag having a top portion, a sealed bottom portion, an open end adjacent said top portion, and a perforation between said top and bottom portions adjacent said top portion, wherein said perforation extends substantially across the entire width of said bag;

(b) placing said bag within said outer container;

(c) placing said bananas inside said inner container;

(d) closing said bag by means of a cord tied about the periphery of said top portion in order to substantially seal the top portion of said bag to thus containerize said bananas; said cord being positioned such that it is accessible from the exterior through a side wall of said outer container such that said inner container is openable to provide increased ventilation without opening said outer container and while said inner and outer container is in a stacked array of inner and outer containers;

(e) shipping said containerized bananas to a second location;

(f) pulling said cord through a sidewall of said outer container in order to sever said bag at said perforation thereby removing said top portion of said bag so as to provide increased ventilation to said bananas through said ventilation opening without opening said outer container; and (g) storing said containerized bananas at said second location.

* * * * *